United States Patent
Hsia

(10) Patent No.: US 9,826,595 B2
(45) Date of Patent: Nov. 21, 2017

(54) LINEAR SOLID-STATE LIGHTING WITH ELECTRIC SHOCK CURRENT SENSING

(71) Applicant: Aleddra Inc., Renton, WA (US)

(72) Inventor: Chungho Hsia, Bellevue, WA (US)

(73) Assignee: ALEDDRA INC., Renton, WA (US)

( * ) Notice: Subject to any disclaimer, the term of this patent is extended or adjusted under 35 U.S.C. 154(b) by 0 days.

(21) Appl. No.: 15/444,536

(22) Filed: Feb. 28, 2017

(65) Prior Publication Data

US 2017/0171937 A1    Jun. 15, 2017

Related U.S. Application Data

(63) Continuation-in-part of application No. 15/362,772, filed on Nov. 28, 2016, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015,
(Continued)

(51) Int. Cl.
| | |
|---|---|
| H05B 33/08 | (2006.01) |
| F21V 25/10 | (2006.01) |
| F21K 9/278 | (2016.01) |
| F21K 9/272 | (2016.01) |
| F21Y 115/10 | (2016.01) |
| F21Y 103/10 | (2016.01) |

(52) U.S. Cl.
CPC ......... *H05B 33/0887* (2013.01); *F21K 9/272* (2016.08); *F21K 9/278* (2016.08); *F21V 25/10* (2013.01); *H05B 33/0809* (2013.01); *H05B 33/0845* (2013.01); *F21Y 2103/10* (2016.08); *F21Y 2115/10* (2016.08)

(58) Field of Classification Search
None
See application file for complete search history.

(56) References Cited

U.S. PATENT DOCUMENTS

| | | | |
|---|---|---|---|
| 8,749,167 B2* | 6/2014 | Hsia | F21V 25/00 315/209 R |
| 2010/0156324 A1* | 6/2010 | Nagase | H05B 33/089 315/307 |

(Continued)

*Primary Examiner* — Douglas W Owens
*Assistant Examiner* — James H Cho
(74) *Attorney, Agent, or Firm* — Han IP Corporation; Andy M. Han

(57) ABSTRACT

A linear light-emitting diode (LED)-based solid-state lamp comprises an LED driving circuit, LED arrays, at least one rectifier, and an operation monitoring module. The LED driving circuit comprises a current sensing device that is originally used to precisely control an electric current to flow into the LED arrays. The operation monitoring module uses the same current sensing device in a way that it detects an electric shock current and determines if the linear LED-based solid-state lamp is operated in a normal mode or in an electric shock hazard mode. When an electric shock hazard is identified, the operation monitoring module shut off a return current flow from the LED arrays to reach the at least one rectifier, thus eliminating an overall through-lamp electric shock current. The scheme can effectively reduce a risk of electric shock hazard to users during relamping or maintenance.

15 Claims, 5 Drawing Sheets

Related U.S. Application Data now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

(56) References Cited

U.S. PATENT DOCUMENTS

| | | | | |
|---|---|---|---|---|
| 2011/0260614 A1* | 10/2011 | Hartikka | ............ | H05B 33/0803 |
| | | | | 315/51 |
| 2012/0032610 A1* | 2/2012 | Kang | .................... | H02M 3/156 |
| | | | | 315/297 |
| 2012/0181952 A1* | 7/2012 | Roeer | ................ | H05B 33/0809 |
| | | | | 315/307 |
| 2013/0320869 A1* | 12/2013 | Jans | ................... | H05B 33/0803 |
| | | | | 315/186 |

* cited by examiner

LINEAR SOLID-STATE LIGHTING WITH ELECTRIC SHOCK CURRENT SENSING

CROSS-REFERENCE TO RELATED APPLICATIONS

The present disclosure is part of a continuation-in-part (CIP) application of U.S. patent application Ser. No. 15/362,772, filed 28 Nov. 2016 and currently pending, which is a CIP application of U.S. patent application Ser. No. 15/225,748, filed 1 Aug. 2016 and currently pending, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. The above-identified applications are incorporated herein by reference in their entirety.

BACKGROUND

Technical Field

The present disclosure relates to linear light-emitting diode (LED) lamps and more particularly to a linear LED lamp with electric shock current sensing, configured to shut off an accidental LED current to reach ground through a person's body.

Description of the Related Art

Solid-state lighting from semiconductor light-emitting diodes (LEDs) has received much attention in general lighting applications today. Because of its potential for more energy savings, better environmental protection (no hazardous materials used), higher efficiency, smaller size, and much longer lifetime than conventional incandescent bulbs and fluorescent tubes, the LED-based solid-state lighting will be a mainstream for general lighting in the near future. As LED technologies develop with the drive for energy efficiency and clean technologies worldwide, more families and organizations will adopt LED lighting for their illumination applications. In this trend, the potential safety concerns such as risk of electric shock become especially important and need to be well addressed.

In today's retrofit application of a linear LED tube (LLT) lamp to replace an existing fluorescent tube, consumers may choose either to adopt a ballast-compatible LLT lamp with an existing ballast used to operate the fluorescent tube or to employ an AC mains-operable LED lamp by removing/bypassing the ballast. Either application has its advantages and disadvantages. In the former case, although the ballast consumes extra power, it is straightforward to replace the fluorescent tube without rewiring, which consumers may have a first impression that it is the best alternative to fluorescent tube lamps. But the fact is that total cost of ownership for this approach is high regardless of very low initial cost. For example, the ballast-compatible LLT lamps work only with particular types of ballasts. If the existing ballast is not compatible with the ballast-compatible LLT lamp, the consumers will have to replace the ballast. Some facilities built long time ago incorporate different types of fixtures, which requires extensive labor for both identifying ballasts and replacing incompatible ones. Moreover, a ballast-compatible LLT lamp can operate longer than the ballast. When an old ballast fails, a new ballast will be needed to replace in order to keep the ballast-compatible LLT lamps working. Maintenance will be complicated, sometimes for lamps and sometimes for ballasts. The incurred cost will preponderate over the initial cost savings by changeover to the ballast-compatible LLT lamps for hundreds of fixtures throughout a facility. When the ballast in a fixture dies, all the ballast-compatible tube lamps in the fixture go out until the ballast is replaced. In addition, replacing a failed ballast requires a certified electrician. The labor costs and long-term maintenance costs will be unacceptable to end users. From energy saving point of view, a ballast constantly draws power, even when the ballast-compatible LLT lamps are dead or not installed. In this sense, any energy saved while using the ballast-compatible LLT lamps becomes meaningless with the constant energy use by the ballast. In the long run, ballast-compatible LLT lamps are more expensive and less efficient than self-sustaining AC mains-operable LLT lamps.

On the contrary, an AC mains-operable LLT lamp does not require a ballast to operate. Before use of an AC mains-operable LLT lamp, the ballast in a fixture must be removed or bypassed. Removing or bypassing the ballast does not require an electrician and can be replaced by end users. Each AC mains-operable LLT lamp is self-sustaining. If one AC mains-operable tube lamp in a fixture goes out, other lamps in the fixture are not affected. Once installed, the AC mains-operable LLT lamps will only need to be replaced after 50,000 hours. In view of above advantages and disadvantages of both ballast-compatible LLT lamps and AC mains-operable LLT lamps, it seems that market needs a most cost-effective solution by using a universal LLT lamp that can be used with the AC mains and is compatible with an electronic ballast so that LLT lamp users can save an initial cost by changeover to such a universal LLT lamp followed by retrofitting the lamp fixture to be used with the AC mains when the ballast dies.

In the U.S. patent application Ser. No. 14/688,841, filed Apr. 16, 2015, two shock prevention switches and an all-in-one driving circuit are adopted in an LLT lamp such that AC power from either an electronic ballast or the AC mains can operate the lamp without operational uncertainty and electric shock hazards. In other words, no matter what a lamp fixture is configured as the AC mains or an electronic ballast compatible fashion, the LLT lamp automatically detects configurations and works for either one. All of such LLT lamps, no matter whether AC mains-operable or ballast compatible, are electrically wired as double-ended and have one construction issue related to product safety and needed to be resolved prior to wide field deployment. This kind of LLT lamps, if no shock prevention scheme is adopted in, always fails a safety test, which measures a through-lamp electric shock current. Because an AC-mains voltage applies to both opposite ends of the tube when connected to a power source, the measurement of current leakage from one end to the other consistently results in a substantial current flow, which may present a risk of an electric shock during re-lamping. Due to this potential shock risk to the person who replaces the LLT lamps in an existing fluorescent tube fixture, Underwriters Laboratories (UL) uses its safety standard, UL 935, Risk of Shock During Relamping (Through Lamp), to do a current leakage test and to determine if the LLT lamps meet the consumer safety requirement. Although the LLT lamps used with an electronic ballast can pass the current leakage test, some kinds of electric shock hazards do exist. Experimental results show that the skin of the person who touches an exposed bi-pin may be burned due to such an electric shock. Fortunately, a mechanism of double shock prevention switches used in applications with the AC mains is also effective in applications with the ballasts to prevent the electric shock from occurring, thus protecting consumers from such a hazard, no matter whether input voltage is from the AC mains or the electronic ballast. Therefore, a universal LLT lamp that can work with either the AC mains or the electronic ballast makes sense. The effectiveness of using double shock prevention switches for applications in the AC mains has been well addressed in U.S. Pat. No. 8,147,091, issued on Apr. 3, 2012. However, a conventional shock prevention switch has an inherent issue related to an electric arc when operated with an electronic ballast. Unlike an AC voltage of 120 or 277 V/50-60 Hz from the AC mains, the output AC voltage and current from the electronic ballast presents a negative resistance characteristic. The feature that originally supports a fluorescent tube to function properly becomes extremely detrimental to the conventional shock prevention switch due to the electric arc likely occurring between two electrical contacts that have a high electric potential difference with a high frequency, such as 600 V/50 kHz. Once a consumer fails to follow installation instructions to install or uninstall linear LED tube lamps such that one of two ends of the tube lamp is in the fixture socket connected to a powered electronic ballast, and the other end is tweaked to connect to or disconnect from the associated socket, an internal arcing may occur between the electrical contacts in the associated switch. The arcing even in a short period such as several seconds can generate high heat, burning and melting electrical contacts and neighboring plastic enclosures, creating a fire hazard. The AC voltage of 120 or 277 V/50~60 Hz from the AC mains does not have such an issue because its voltage is relatively low compared with the ballast output voltage of 600 V. Moreover, the AC frequency of 60 Hz automatically extinguishes an arc every $\frac{1}{60}$ seconds, if existed. That is why a utility switch can be used in an electrical appliance to turn power on and off without any problem. However when used with the electronic ballast, the electrical contacts used in the conventional shock prevention switch can easily be burned out due to the high-voltage and high-frequency arcing introduced between each gap of each pair of the electrical contacts in the conventional shock prevention switch when someone tries to abusively tweak to remove the tube lamp from the fixture with the ballast that has a power on it. Although such a situation is rare, an internal arcing, if occurred, does cause burning and even welding of the electrical contacts and melting of the plastic enclosure, so called internal fire, creating consumer safety issues.

Today, such LLT lamps are mostly used in a ceiling light fixture with a wall-mount power switch. The ceiling light fixture could be an existing one used with fluorescent tubes but retrofitted for LLT lamps or a specific LLT lamp fixture. The drivers that provide a proper voltage and current to LED arrays could be internal or external ones. Not like LLT lamps with an external driver that is inherently electric-shock free if the driver can pass a dielectric withstand test used in the industry, LLT lamps with an internal driver could have a shock hazard during relamping or maintenance, when the substantial through-lamp electric shock current flows from any one of AC voltage inputs through the internal driver connecting to LED arrays to the earth ground. Despite this disadvantage, LLT lamps with the internal driver still receive wide acceptance because they provide a stand-alone functionality and an easy retrofit for an LLT lamp fixture. As consumerism develops, consumer product safety becomes extremely important. Any products with electric shock hazards and risk of injuries or deaths are absolutely not acceptable for consumers. However, commercially available LLT lamps with internal drivers, single-ended or double-ended, fail to provide effective solutions to the problems of possible electric shock and internal arcing and fire.

In the prior art mentioned above, the double shock protection switches with mechanical actuation mechanisms protruding outwards from both ends of the LLT lamp are proposed to be used in the LLT lamp. However, a length control of the LLT lamp becomes critical to operate the LLT lamp because sometimes the double shock protection switches may not be actuated by the mechanical actuation mechanisms. Also, the conventional LLT lamp is so vulnerable because it may cause internal fire if consumers abusively tweak the mechanical actuation mechanisms at both ends of the LLT lamp operable with an electronic ballast during relamping. It is therefore the purpose of the present disclosure to disclose an electric shock current sensing approach to be used in the LLT lamp to eliminate above-mentioned electric shock and internal fire hazards and to work more reliably to protect consumers.

SUMMARY

A linear light-emitting diode (LED)-based solid-state lamp comprising two lamp bases respectively connected to two ends of a housing, each lamp base comprising at least one electrical conductor connecting to a lamp fixture socket; at least one rectifier; an LED driving circuit; LED arrays; and an operation monitoring module, is used to replace a fluorescent tube or a conventional LED tube lamp without the operation monitoring module in an existing lamp fixture. The LED driving circuit comprises a current sensing device that is originally used to precisely control an electric current to flow into the LED arrays. The operation monitoring module uses the same current sensing device in a way that it detects an electric shock current and determines if the LED-based solid-state lamp is operated in a normal mode or in an electric shock hazard mode. When an installer touches an exposed at least one electrical conductor on a lamp base, and when an electric shock hazard is identified, the operation monitoring module shut off a return current flow from the LED arrays to reach the at least one rectifier, thus eliminating an overall through-lamp electric shock current.

The operation monitoring module comprises an error amplifier, a power up control, a logic control, a switch control section, and at least one switch configured to connect or disconnect the electric current return from the LED arrays. The at least one switch is connected between the LED arrays and the at least one rectifier. When the current sensing device detects an electric shock current that appears at an exposed at least one electrical conductor, the operation monitoring module controls the at least one switch to disconnect the electric current flow on the at least one switch, thus turning off the power delivering to the LED arrays. The logic control in the operation monitoring module maintains the at least one switch in "off" state until the exposed at least one electrical conductor is removed from the installer and normally installed in the lamp fixture socket receiving a normal AC voltage. When the current sensing device detects no electric shock current, the operation monitoring module controls the at least one switch to continue "on", thus the electric current being able to continue to flow out from the LED arrays. The scheme can effectively reduce a risk of electric shock hazard to users during relamping or maintenance.

The LED driving circuit further comprises a Buck control circuit comprising an inductor, a diode, and a switch. The current sensing device can be connected in front of or after the LED arrays and the inductor, in which the current sensing device is respectively at high electric potential side and a low electric potential side along an LED current path. In one embodiment, the operation monitoring module receives a signal from the current sensing device connected at the low electric potential side along the LED current path in the LED driving circuit, in which a low electric potential terminal of the current sensing device is directly connected to the at least one rectifier through the at least one switch in the operation monitoring module.

In another embodiment, the operation monitoring module receives a signal from the current sensing device connected at the high electric potential side along the LED current path in the LED driving circuit, in which the low electric potential terminal of the current sensing device is indirectly connected to the at least one rectifier, rather through the inductor, LED arrays, and the at least one switch. Although configurations of the Buck control circuit in two embodiments are different, the current sensing device originally working with the Buck control circuit can effectively provide a detection signal of the electric shock current for the operation monitoring module to process and to shut off the electric shock current.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF THE INVENTION

Figure 1:
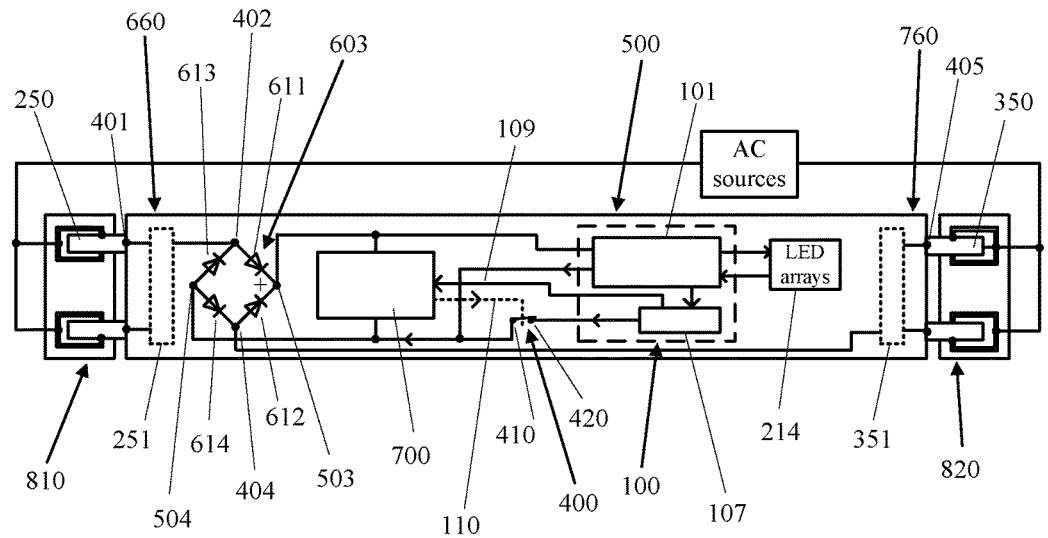
FIG. 1 is an embodiment of an LLT lamp installed in lamp fixture sockets connected with AC power sources according to the present disclosure.

FIG. 1 is an embodiment of an LLT lamp installed in lamp fixture sockets connected with alternate current (AC) sources according to the present disclosure. The LLT lamp 500 comprises a housing having two ends; two lamp bases 660 and 760 each having at least one electrical conductor 250 and 350 at each end of the housing; an operation monitoring module 700; a pair of electrical contacts 410 and 420 of at least one switch 400 controlled by the operation monitoring module 700; at least one rectifier 603 comprising diodes 611, 612, 613, and 614 interconnected at ports 402, 404, 503, and 504; an LED driving circuit 100 having a first and a second inputs 503 and 504; and LED arrays 214 disposed between the two ends of the housing with the LED arrays 214 connected to the LED driving circuit 100. The LLT lamp may further comprise an interface module 251 and 351 for each lamp base configured to work with an electronic ballast for maximum compatibility. The interface module may comprise a resistor, a resistor in parallel with capacitor, a jumper, or simply a passing-through connection such as a direct connection between a connection point 401 and the interconnection port 402 for the interface module 251 and a direct connection between a connection point 405 and the interconnection port 404 for the interface module 351. In the following description, such direct connections will be used for simplicity. The LED driving circuit 100 comprises a Buck control circuit 101 and a current sensing device 107 connected to the Buck control circuit 101, which is connected to the LED arrays 214. When the at least one electrical conductor 250 and the at least one electrical conductor 350 in each lamp base are inserted into the lamp fixture sockets 810 and 820, the at least one rectifier 603 receives AC power through the at least one electrical conductors 250 and 350 at each end of the housing and converts into a DC (direct current) voltage to supply the LED driving circuit 100. An LED current will flow into the LED arrays 214 and return to the current sensing device 107, passing through it with a current sensing signal sent through an electrical connection 109 to the operation monitoring module 700. Because the at least one electrical conductor 250 and the at least one electrical conductor 350 in each lamp base are inserted into the lamp fixture sockets 810 and 820, the at least one rectifier 603 receives a normal input AC voltage and converts into a DC voltage without a compromise. The Buck control circuit 101 delivers a current equal to a preset value to the LED arrays 214 by using current sensing device 107. At the same time, and the current sensing device 107 senses a correct current passing through and sends a current sensing signal through the electrical connection 109 to the operation monitoring module 700. The operation monitoring module 700 then controls the at least one switch 400 through a control link 110 so that the electrical contacts 410 and 420 of the at least one switch 400 are electrically connected. Consequently, the electric current returned from the LED arrays 214 can flow back to the at least one rectifier to complete a power transfer.

When either one of the at least one electrical conductor 250 and the at least one electrical conductor 350 in each lamp base is inserted into the lamp fixture sockets 810 or 820 that is connected with "L" of AC mains, the LLT lamp does not light up but is live and energized, meaning that there is an electric shock hazard. If an installer touches the exposed at least one electrical conductor 250 or at least one electrical conductor 350 in each lamp base, an electric shock current can flow from the LED arrays through the electric current sensing device 107, and the at least one switch 400 to reach the at least one rectifier 603, further flowing to earth ground through the installer's body, creating an electric shock hazard. However, when such a situation exists, the at least one rectifier 603 receives a compromised AC voltage according to a divided voltage because a human body is analogous to a 500 ohm-resistor. When a DC voltage provided by the at least one rectifier 603 is not as high as expected, an electric current provided to drive the LED arrays 214 by the Buck control circuit 101 is lower than a preset value, the same as the electric current return from the LED arrays 214. The sensing device 107 senses a current decrease and sends a signal through the electrical connection 109 to the operation monitoring module 700, which then controls the at least one switch 400 through the control link 110 to turn off an electrical connection between the electrical contacts 410 and 420 of the at least one switch 400. Thus the electric shock current is blocked, no substantial leakage current flowing out to the exposed at least one conductor on either lamp base. As can be seen in FIG. 1, two sockets in each of the external fixture lamp sockets 810 and 820 are shunted, meaning that as long as the at least one electrical conductor 250 in the lamp base 660 and the at least one electrical conductor 350 in the lamp base 760 connect to the AC power sources, the LLT lamp can operate with an acceptable through-lamp electric shock current, which is deemed safe for users.

Figure 2:
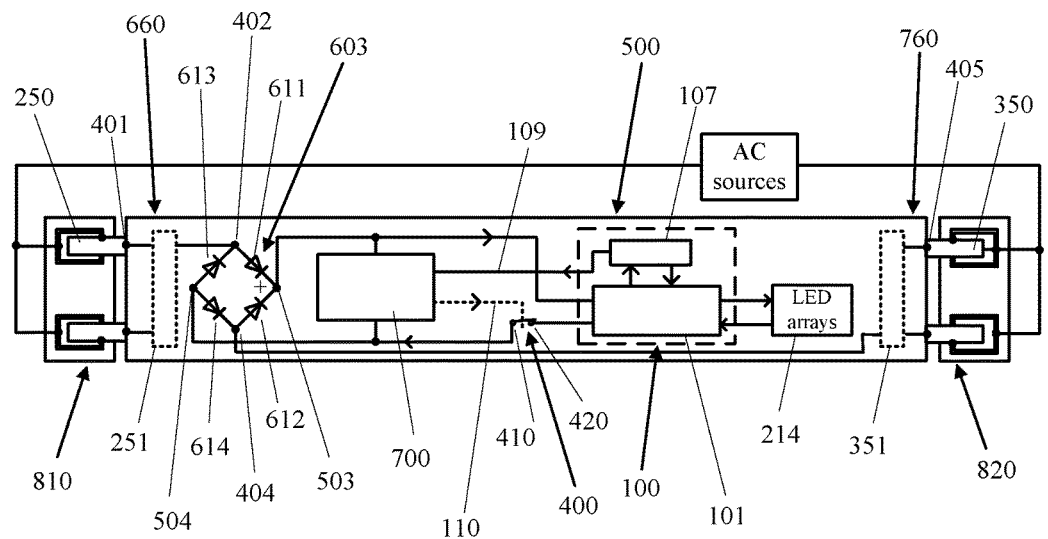
FIG. 2 is another embodiment of an LLT lamp installed in lamp fixture sockets connected with AC power sources according to the present disclosure.

FIG. 2 is another embodiment of an LLT lamp installed in lamp fixture sockets connected with AC power sources according to the present disclosure. FIG. 2 is almost the same as FIG. 1 except that the current sensing device 107 at a low electric potential side depicted in FIG. 1 is arranged at a high electric potential side in FIG. 2. In this case, a DC current supplied by the at least one rectifier 603 passes through the current sensing device 107 before going into the LED arrays 214. Same as in FIG. 1, when the DC voltage provided by the at least one rectifier 603 is not as high as expected due to a compromised input voltage in the electric shock current hazard, the electric current provided to drive the LED arrays 214 by the Buck control circuit 101 is lower than a preset value, the same as the electric current return from the LED arrays 214. The current sensing device 107 senses a current decrease and sends a signal through the electrical connection 109 to the operation monitoring module 700, which then controls the at least one switch 400 through the control link 110 to turn off an electrical connection between the electrical contacts 410 and 420 of the at least one switch 400. Thus the electric shock current is blocked, no substantial leakage current flowing out to the exposed at least one conductor on either lamp base.

Figure 3:
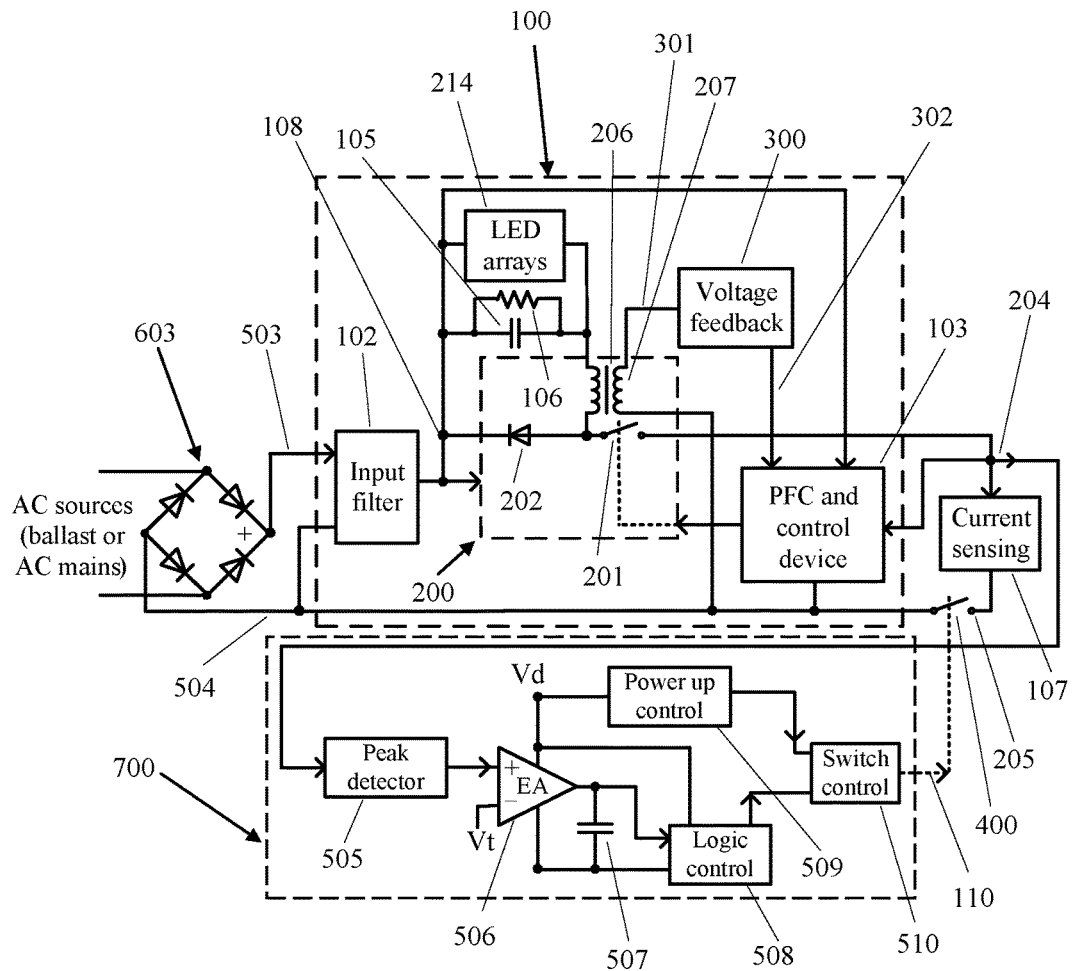
FIG. 3 is an embodiment of an LED driving circuit configured to detect electric shock current according to the present disclosure.

FIG. 3 is an embodiment of an LED driving circuit configured to detect electric shock current according to the present disclosure. The at least one rectifier 603 connecting to an AC power source, either the AC mains or an electronic ballast, converts an AC into a DC voltage. The LED driving circuit 100 connecting to the at least one rectifier 603 comprises an input filter 102 used to filter the input voltage and to suppress EMI noise created in the LED driving circuit 100, a power factor correction (PFC) and control device 103, a Buck converter 200 in communicating with the PFC and control device 103, a switch 201 controlled by the PFC and control device 103, an output capacitor 105 in parallel with a resistor 106 connected to the Buck converter 200 to build up an output voltage and to power the LED arrays 214, a current sensing device 107, and a voltage feedback module 300 extracting partial energy from the output voltage to sustain the PFC and control device 103. The at least one rectifier 603 has four input/output ports, among which a high electric potential appears at the input/output port 503, and a low electric potential appears at the input/output port 504 respectively connecting to the high side and the low side of the input filter 102 with the low electric potential port 504 as a common ground.

In FIG. 3, when the power is on, an input current enters the input filter 102 and then the PFC and control device 103, turning on the switch 201. Whereas the diode 202 is reverse-biased, the input current goes from the resistor 106 and the LED arrays 214, a primary winding of the transformer 206, the switch 201, and the current sensing device 107 to the common ground 504. The primary winding of the transformer 206 serves as an inductor. When the input current goes into the primary winding of the transformer 206, energy is stored in it. The PFC and control device 103 detects the input voltage level and control the switch 201 on and off in a way that a desired or otherwise predetermined output voltage $V_o$ across the LED arrays 214 is reached to light up the LED arrays 214. When the switch 201 is off, the diode 202 is forward-biased, and the primary winding of the transformer 206 releases the energy stored, resulting in a loop current flowing from the diode 202 and the LED arrays 214, back to the primary winding of the transformer 206, completing the energy transfer to the LED arrays 214. When the switch 201 is on, the input current flows into the LED arrays 214, the primary winding of the transformer 206, the switch 201, and the current sensing device 107, creating a voltage drop across the current sensing device 107. The voltage appearing at the port 204 of the current sensing device 107 inputs to the PFC and control device 103 to control the off-time of the switch 201. The voltage feedback module 300 has two connection ports 301 and 302, with the first connection port 301 connecting to a high side of a secondary winding 207 in the transformer 206 and with the second connection port 302 connecting to the PFC and control device 103. The voltage feedback module 300 continuously monitors the output voltage by using the secondary winding 207 in the transformer 206. When the voltage at the high side of the secondary winding 207 is higher than a becoming lower operating voltage in the PFC and control device 103 due to increased internal operations, the diode (not shown) in the voltage feedback module 300 conducts to supply energy in time through the second connection port 302 to sustain the operating voltage in the PFC and control device 103.

In FIG. 3, the LED driving circuit 100 is further connected to the operation monitoring module 700 for electric shock current detection. The operation monitoring module 700 comprises a peak detector 505, an error amplifier 506 with an output connected to an output capacitor 507, a logic control 508, a power up control 509, a switch control section 510, and at least one switch 400 configured to connect or disconnect the electric current return from the LED arrays 214. The peak detector 505 receives a signal from the first port 204 of the current sensing device 107 and feeds the error amplifier 506. The error amplifier 506 then generates an error signal associated with a measured voltage from the peak detector 505 and a preset voltage $V_t$ and sends the error signal to the logic control 508, subsequently controlling the switch control section 510 to control the at least one switch 400 to switch on when an electric shock current is not detected or to switch off when an electric shock current is detected. The power up control dictates the switch control 510 to turn on the at least one switch 400 only in a short period when power is on no matter whether an input voltage is normal or compromised due to the electric shock current.

After the short power-up period, the logic control 508 takes over the switch control 510 to turn the at least one switch 400 on or off based on the error signal generated. The logic control comprises a one-bit memory to latch the at least one switch 400 in a way that the at least one switch 400 will remain on if the electric shock current is not detected and remain off if the electric shock current is detected in the short power-up period. This function ensures that the LLT lamp can operate more reliably without flickering when an input voltage accidentally becomes lower than a standard line voltage due to possible power grid fluctuations in a long time.

Figure 4:
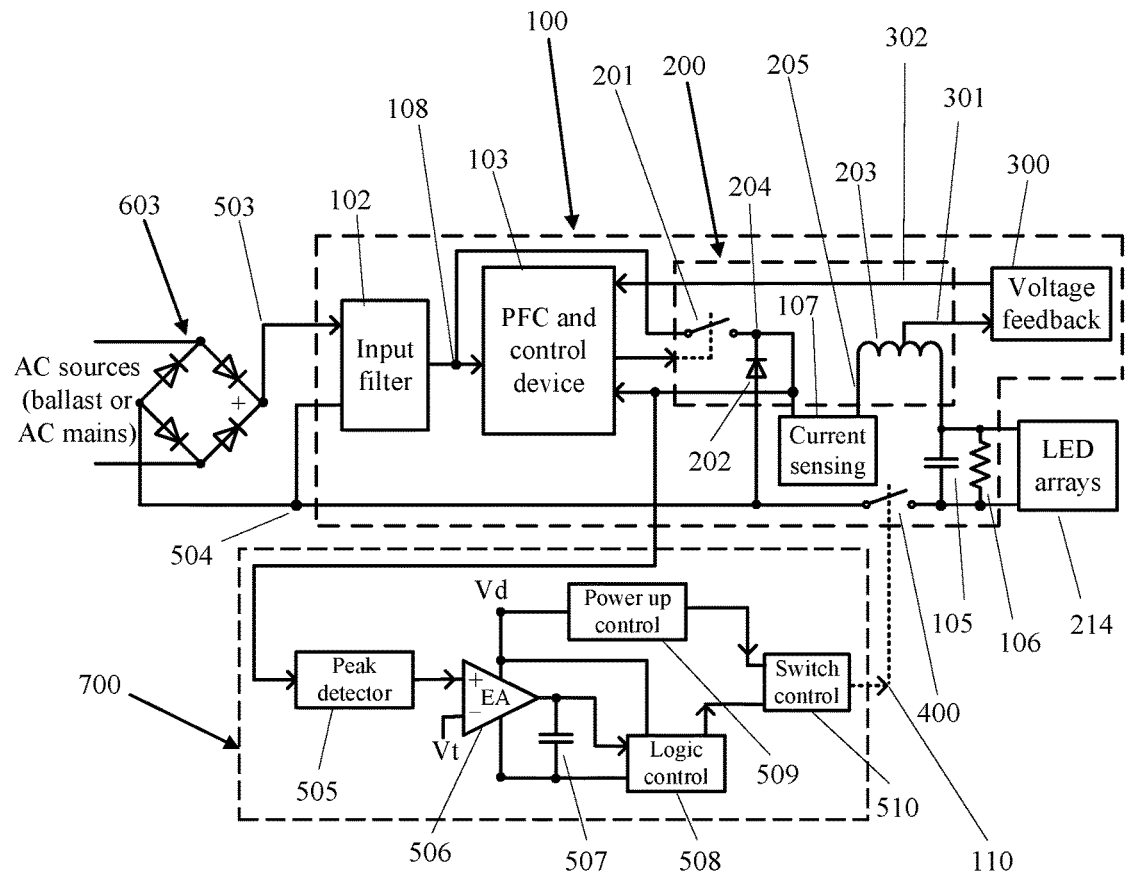
FIG. 4 is another embodiment of an LED driving circuit configured to detect electric shock current according to the present disclosure.

FIG. 4 is another embodiment of an LED driving circuit configured to detect electric shock current according to the present disclosure. FIG. 4 has all the components as in FIG. 3, except that interconnections are different, that the current sensing device 107 is at a high electric potential side rather than at the low electric potential side as in FIG. 3, and that a center-tapped inductor 203 in FIG. 4 replaces the transformer 206 in FIG. 3. In FIG. 4, the same numerals are used for the same components as in FIG. 3. In FIG. 4, the Buck converter 200 comprises a switch 201 controlled by the PFC and control device 103, a diode 202, and an inductor 203 with its current charging and discharging controlled by the switch 201. The PFC and control device 103 detects zero current in the inductor 203 within an AC cycle of an input voltage generating a zero current detection signal and controls the switch 201 on and off with a constant on-time and a varied off-time controlled by the zero current detection signal. By adapting switching frequencies for a high frequency associated with a ballast and a low frequency associated with the AC mains, the PFC and control device 103 controls the switch 201 on and off in a way that the inductor 203 is charged during on-time and discharged during off-time, and that a desired or otherwise predetermined output voltage $V_o$ across the LED arrays 214 is reached to light up the LED arrays 214. The average inductor current is thus equal to the output current that flows into the LED array 214. When the switch 201 is on, the diode 202 is reverse-biased, and an input current flows from an output port 108 in the input filter 102, the switch 201, the first port 204 of the current sensing device 107, the current sensing device 107 itself, and the second port 205 of the current sensing device 107, into the inductor 203. When the current flowing into the inductor 203 increases, the voltage across the current sensing device 107 increases. The first port 204 of the current sensing device 107 also connects with the PFC and control device 103, which continuously receives signals and adjusts the off-time such that the output voltage and current to the LED arrays 214 are regulated to meet the output requirements. The output capacitor 105 in parallel with the resistor 106 connects to the inductor 203, receiving energy to build up an output voltage and to power the LED arrays 214.

The inductor 203 configured as an autotransformer has a center-tapped port connecting to the voltage feedback module 300 comprising a diode. The voltage feedback module 300 has two connection ports 301 and 302, with the first connection port 301 connecting to the center-tapped port of center-tapped inductor 203 and with the second connection port 302 connecting to the PFC and control device 103. The PFC and control device 103 has an input capacitor (not shown) with a voltage built up to supply an internal logic control circuit (not shown) in the PFC and control device 103. When the voltage decreases due to its increased internal operations and controls, and when the voltage at the center-tapped port of the inductor 203 is higher than the supplying voltage, the diode in the voltage feedback module 300 conducts to supply a current to the PFC and control device 103 and sustain its operations. The function of the voltage feedback module 300 is essential because the LED driving circuit 100 has a wide range of operating voltages not only 110 and 277 VAC for AC mains but also 350~600 VAC for an electronic ballast. In the PFC and control device 103, a start-up resistor (not shown) is so designed to operate a LLT lamp at the lowest input voltage 110 VAC. When the highest voltage 600 VAC from the electronic ballast comes in, a higher proportional voltage appears at an input of the internal logic control circuit. Therefore an operating voltage for the internal logic control circuit must be in a wide range such as 11~35 VDC rather than 5~15 VDC as in a conventional logic control device. To meet requirements of start-up time and current without turn-on failure or flickering occurred at the lamp start-up, the input capacitor in the PFC and control device 103 with a minimum capacitance is designed and used at the input of the internal logic control circuit. The voltage feedback module 300 is thus needed to pump in energy in time and to sustain the operating voltage and ensure no flickering occurred when operating the LLT lamp.

When the switch 201 is off, the diode 202 is forward-biased, and the inductor 203 discharges with a loop current flowing from the LED arrays 214, the diode 202, the current sensing resistor 107, back to the inductor 203. The current sensing resistor 107 keeps track of the output current and feedbacks to the PFC and control device 103 to further control the switch 201 on and off. The closed loop operation in both on-time and off-time of the switch 201 ensures the output current to be accurately controlled within 4%.

In FIG. 4, the LED driving circuit 100 is also connected to the operation monitoring module 700 for electric shock current detection as in FIG. 3. Similarly, the operation monitoring module 700 detects if the electric shock current exists for a short period when power is on. If the electric shock current is detected, the operation monitoring module 700 controls the at least one switch 400 to turn off, thus blocking the electric shock current to flow to the earth ground through the installer's body. On the other hand, if the electric shock current is not detected for a short period when power is on, the operation monitoring module 700 controls the at least one at least one switch 400 to turn on, thus allowing the current return from the LED arrays 214 to reach the earth ground and completing an energy transfer to the LED arrays 214 for lighting.

Figure 5:
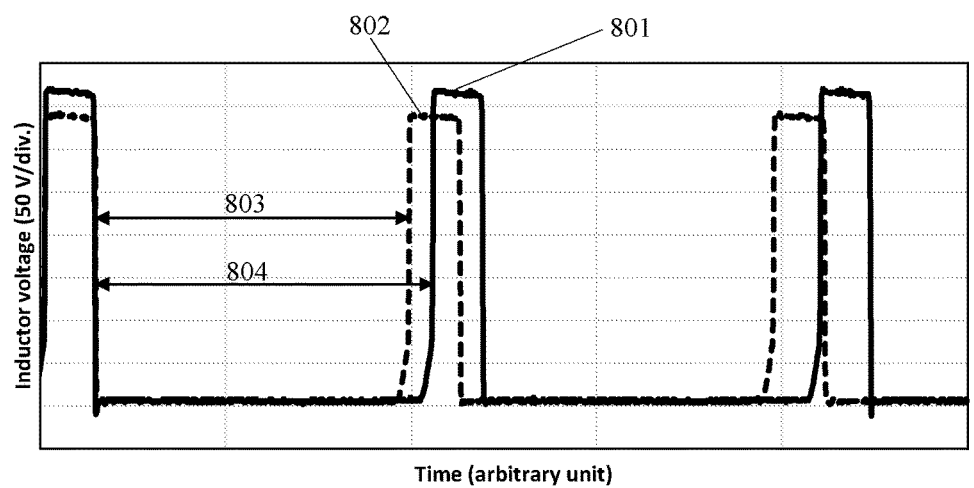
FIG. 5 shows two waveforms of a voltage measured across an inductor used in an LED driving circuit when an AC voltage from 285 V AC mains is used to operate an LLT lamp according to the present disclosure.

FIG. 5 shows two waveforms of a voltage measured across an inductor used in an LED driving circuit 100 when an AC voltage from 285 V AC mains is used to operate an LLT lamp according to the present disclosure. As mentioned above, when the installer touches an exposed at least one conductor on one end of the LLT lamp with the at least one conductor on the other end of the LLT lamp installed in a fixture socket with "L" of the AC mains, the at least one rectifier 603 (in FIG. 1) receives a compromised AC voltage according to a divided voltage because a human body is analogous to a 500 ohm-resistor. When a DC voltage provided by the at least one rectifier 603 is not as high as a normal voltage, the electric current provided to drive the LED arrays 214 by the Buck control circuit 101 is lower than a preset value, the same as the electric current return from the LED arrays 214. FIG. 5 shows two inductor voltage waveforms measured when the Buck control circuit 101 (in FIG. 1) is operated in a normal voltage mode and in an electric shock hazard mode for a line voltage of 285 V from the AC mains. The peak-to-peak inductor voltage swing in FIG. 5 represents a rectified DC voltage. As can be seen, the waveform 801 in the normal voltage mode shows a higher inductor voltage than that of the waveform 802 in the electric shock hazard mode. In addition, the Buck control circuit 101 adjusts the switch off-time 803 to be shorter than the off-time 804 in the normal voltage mode to cope with such a lower input voltage in an electric shock hazard mode.

Figure 6:
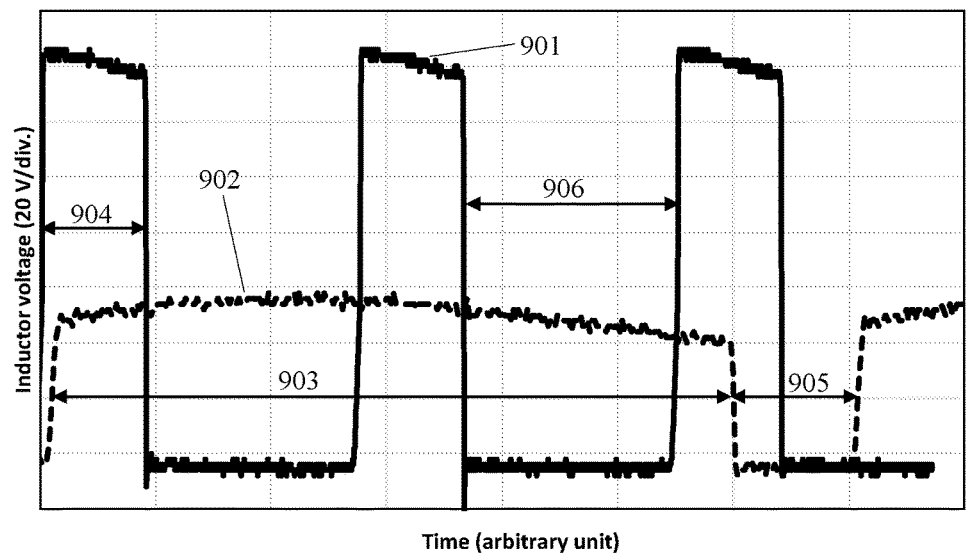
FIG. 6 shows two waveforms of a voltage measured across an inductor used in an LED driving circuit when an AC voltage from 120 V AC mains is used to operate an LLT lamp according to the present disclosure.

FIG. 6 shows two waveforms of a voltage measured across an inductor used in an LED driving circuit 100 when an AC voltage from 120 V AC mains is used to operate an LLT lamp according to the present disclosure. FIG. 6 shows two inductor voltage waveforms measured when the Buck control circuit 101 (in FIG. 1) is operated in a normal voltage mode and in an electric shock hazard mode for a line voltage of 120 V from the AC mains. As can be seen, the waveform 901 in the normal voltage mode shows a higher inductor voltage than that of the waveform 902 in the electric shock hazard mode. Similarly, the Buck control circuit 101 adjusts the switch on-time 903 to be longer than the one-time 904 in the normal voltage mode and adjusts the switch off-time 905 shorter than the off-time 906 in the normal voltage mode to cope with such a lower input voltage in an electric shock hazard mode.

Figure 7:
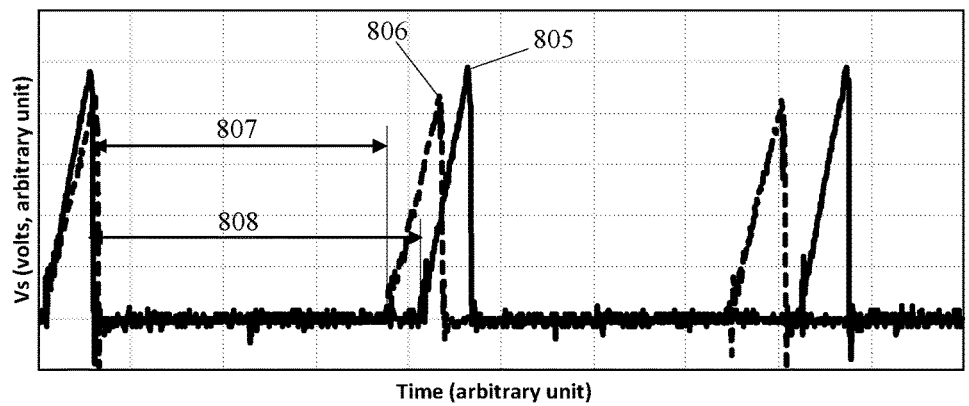
FIG. 7 shows two waveforms of a voltage measured across a current sensing device used in an LED driving circuit when an AC voltage from 285 V AC mains is used to operate an LLT lamp according to the present disclosure.

FIG. 7 shows two waveforms of a voltage measured across an electric current sensing device (e.g., current sensing device 107) used in an LED driving circuit 100 when an AC voltage from 285 V AC mains is used to operate a universal LLT lamp according to the present disclosure. The voltage across the current sensing device 107 corresponds to an inductor charging current also representing a peak LED current. As can be seen, two voltage waveforms measured are different when the Buck control circuit 101 (in FIG. 1) is operated in a normal voltage mode and in an electric shock hazard mode for a line voltage of 285 V from the AC mains. The peak sensing voltage 805 in the normal voltage mode is higher than the peak sensing voltage 806 in the electric shock hazard mode. To cope with such a lower input voltage in an electric shock hazard mode, the Buck control circuit 101 adjusts the inductor discharging time 807 to be shorter than the inductor discharging time 808 in the normal voltage mode.

Figure 8:
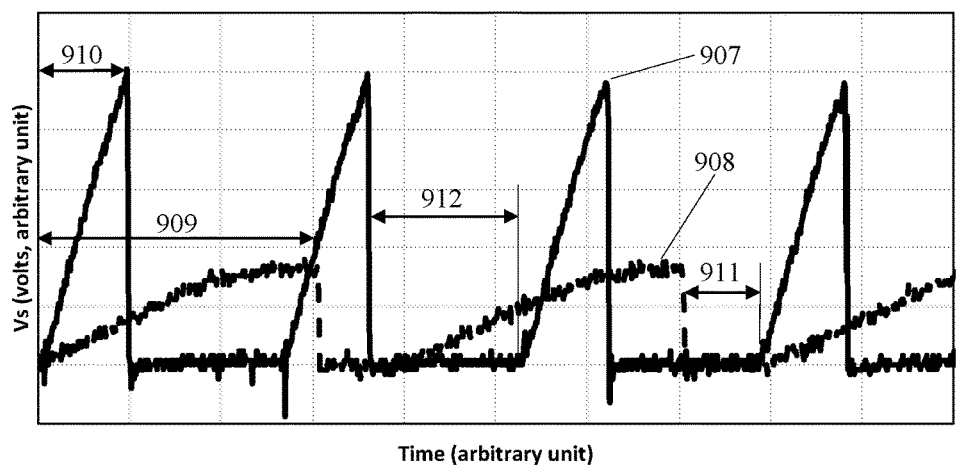
FIG. 8 shows two waveforms of a voltage measured across a current sensing device used in an LED driving circuit when an AC voltage from 120 V AC mains is used to operate an LLT lamp according to the present disclosure.

FIG. 8 shows two waveforms of a voltage measured across a current sensing device (e.g., current sensing device 107) used in an LED driving circuit 100 when an AC voltage from 120 V AC mains is used to operate an LLT lamp according to the present disclosure. As can be seen, two voltage waveforms measured are different when the Buck control circuit 101 (in FIG. 1) is operated in a normal voltage mode and in an electric shock hazard mode for a line voltage of 120 V from the AC mains. The peak of a sensing voltage 907 in the normal voltage mode is higher than the peak of a sensing voltage 908 in the electric shock hazard mode. To cope with such a lower input voltage in an electric shock hazard mode, the Buck control circuit 101 adjusts not only the inductor charging time 909 to be longer than the inductor charging time 910 in the normal voltage mode but also discharging time 911 to be shorter than the inductor discharging time 912 in the normal voltage mode. Therefore, the voltage across an electric current sensing device can be used to detect the electric shock current and feed through the operation monitoring module to further eliminate the electric shock current.

In FIGS. 1 and 2, the electrical contacts 410 and 420 of the at least one switch 400 may be an electrical, an electronic, an electro-mechanical, or a mechanical switch such as one in a solid-state relay, an electronic relay, an electro-mechanical relay, a pair of mechanical contacts, or other bidirectional and unidirectional current control devices such as a triac, a back-to-back thyristor, a silicon-controlled rectifier (SCR), a transistor, a metal-oxide-semiconductor field-effect transistor (MOSFET), a field-effect transistor (FET), a transistor, or various combinations thereof. Also such devices may be connected with some snubber circuits to maintain their functionality under voltage spikes.

In FIGS. 3~4, although the preset voltage $V_t$ to the error amplifier is assumed to be independent of the input voltages, in some cases, there may be an additional voltage detection circuit configured to determine if an input voltage is in a range of 100-120 V or 270-285 V from AC mains, or in a range of 350~600 V from an electronic ballast. The voltage detection circuit thus provides a desired preset voltage to the error amplifier.

Whereas preferred embodiments of the present disclosure have been shown and described, it will be realized that alterations, modifications, and improvements may be made thereto without departing from the scope of the following claims. Another kind of the shock prevention schemes in an LED-based lamp using various kinds of combinations to accomplish the same or different objectives could be easily adapted for use from the present disclosure. Accordingly, the foregoing descriptions and attached drawings are by way of example only, and are not intended to be limiting.

What is claimed is:

1. A linear light-emitting diode (LED) tube lamp, comprising:
   a housing having two ends;
   a plurality of LED arrays disposed between the two ends of the housing;
   an LED driving circuit comprising a current sensing device coupling to the LED arrays;
   two lamp bases respectively connected to the two ends of the housing, each lamp base comprising at least one electrical conductor configured to insert into a respective lamp fixture socket;
   at least one rectifier configured to convert an alternate current (AC) voltage to a direct current (DC) voltage; and
   an operation monitoring module receiving a signal from the current sensing device in the LED driving circuit, wherein:
      when a through-lamp electric shock current is detected by the current sensing device, the operation monitoring module disconnects an electric current return from the LED arrays from reaching the at least one rectifier; and
      when the at least one electrical conductor in each lamp base is inserted into the respective lamp fixture socket, the operation monitoring module enables the LED driving circuit to deliver electrical power to the LED arrays.

2. The linear LED tube lamp of claim 1, wherein the operation monitoring module is configured to receive power from the at least one rectifier.

3. The linear LED tube lamp of claim 1, wherein the current sensing device in the LED driving circuit is configured to receive the electric current return from the LED arrays to perform acts comprising:
   controlling: the LED arrays in a constant current mode;
   detecting the electric current return from the LED arrays; and
   sending a detection signal to the operation monitoring module.

4. The linear LED tube lamp of claim 3, wherein a predetermined electric current return from the LED arrays is preset such that the operation monitoring module operates the linear LED tube lamp with AC mains at voltages/frequency in a range of or at 100~277 V/60 Hz or with electronic ballasts at voltages/frequency in a range of 350~600 V/40~60 kHz.

5. The linear LED tube lamp of claim 1, wherein the operation monitoring module comprises an error amplifier, a power up control, a logic control, a switch control section, and at least one switch configured to connect or disconnect the electric current return from the LED arrays.

6. The linear LED tube lamp of claim 5, wherein the error amplifier is configured to receive a signal from the current sensing device through a peak detector, create an error signal associated with a measured voltage from the peak detector and a preset voltage, and send the error signal to the logic control subsequently controlling the switch control section to switch on the at least one switch when the error signal is not detected or to switch off when the error signal is detected.

7. The linear LED tube lamp of claim 6, wherein the logic control comprises an one-bit memory configured to latch the at least one switch.

8. The linear LED tube lamp of claim 5, wherein the error amplifier is connected to a capacitor.

9. The linear LED tube lamp of claim 5, wherein electrical contacts of the at least one switch comprise electrical terminals of at least one relay.

10. The linear LED tube lamp of claim 9, wherein the at least one relay comprises a solid-state relay, an electronic relay, or an electro-mechanical relay.

11. The linear LED tube lamp of claim 5, wherein electrical contacts of the at least one switch comprise electrical terminals of at least one triac.

12. The linear LED tube lamp of claim 5, wherein electrical contacts of the at least one switch comprise electrical terminals of at least one electronic switch.

13. The linear LED tube lamp of claim 12, wherein the at least one electronic switch comprises a metal-oxide-semiconductor field-effect transistor (MOSFET), a field-effect transistor (FET), a transistor, a back-to-back thyristor, a silicon-controlled rectifier (SCR), or a combination thereof.

14. The linear LED tube lamp of claim 1, wherein the operation monitoring module further comprises a voltage detection circuit configured to determine whether an input voltage is in a range of 100-120 V or 270-285 V from AC mains, or in a range of 350~600 V from an electronic ballast.

15. The linear LED tube lamp of claim 14, wherein the voltage detection circuit is configured to provide a preset voltage to the error amplifier.

* * * * *